T. J. POWERS.
Loading Cartridges.
No. 54,254.
Patented Apr. 24, 1866.
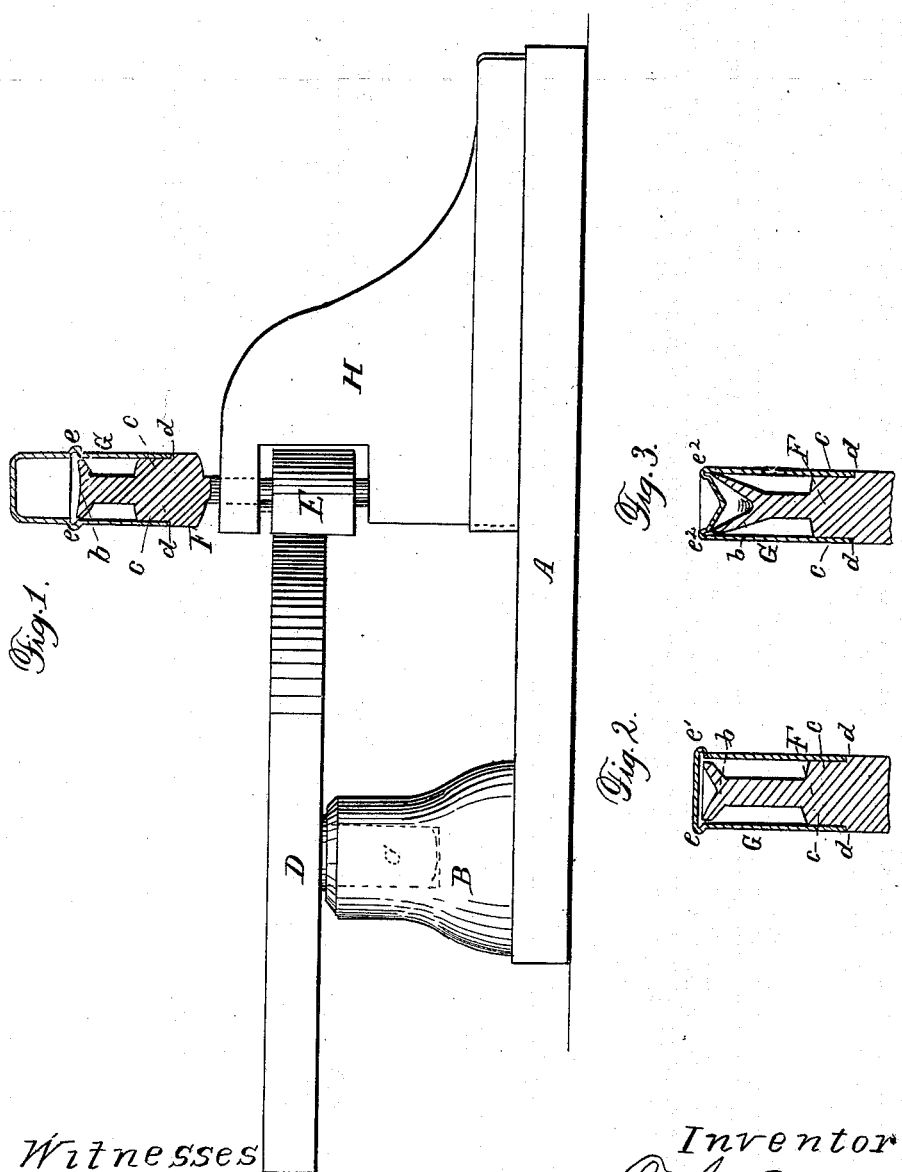

UNITED STATES PATENT OFFICE.

TIMOTHY J. POWERS, OF NEW YORK, N. Y., ASSIGNOR TO J. P. FITCH AND J. R. VAN VECHTEN, OF SAME PLACE.

IMPROVEMENT IN METHODS OF PRIMING METALLIC CARTRIDGES.

Specification forming part of Letters Patent No. 54,254, dated April 24, 1866.

*To all whom it may concern:*

Be it known that I, TIMOTHY J. POWERS, of the city, county, and State of New York, have invented a new and Improved Means of Applying Fulminate Priming in Cartridges; and I do hereby declare that the following is a full, clear, and exact description of the same, reference being had to the accompanying drawings, forming part of this specification.

This invention consists in applying the fulminate priming to cartridges within an annular cavity in the cartridge-shell, or otherwise in an annular form, by means of a revolving spindle, on or in the end of which the fulminate is placed and from which it is thrown into the said annular cavity or deposited in an annular form by centrifugal force.

Figure 1 in the accompanying drawings represents an elevation, partly in section, of a very simple form of machine illustrating the application of my invention. Figs. 2 and 3 are vertical sections of modifications of the revolving spindle adapting it to different kinds of cartridges.

Similar letters of reference indicate corresponding parts in the several figures.

A, Fig. 1, is a horizontal bed-plate, on one end of which is a fixed pillar, B, containing the bearing for the axle C of a driving-wheel, D.

H is a carriage fitted to slide horizontally in guides or ways $a$ on the bed-plate toward and from the driving-wheel D. In this frame are the bearings for the upright spindle F. On the lower part of this spindle, opposite the driving-wheel D, there is a small pulley, E, and the part of the said spindle above the carriage H is of such form and size that the cartridge-shells G may be placed upon it. The said spindle F is so arranged in the carriage that by pushing the carriage up toward the driving-wheel the pulley may be brought in contact with the said wheel. By giving a rotary motion to the driving-wheel while the pulley is thus brought in contact with it, the pulley and spindle are caused to receive a more rapid rotary motion.

The head $b$ of the spindle F is of such diameter that the cartridge-shells will pass over it without touching; but some distance below the head the said spindle is of such size, as shown at C, that the shells may fit it snugly, and a shoulder, $d$, is provided below the part C to form a bearing for the edge of the mouth of the shell, the distance of the said shoulder from the top of the head depending upon the length of the shell or the distance from the mouth at which the fulminate priming is to be applied. The form of the top of the head will require to be varied according to the kind of cartridge-shell to be primed, but, generally speaking, should be concave or cup-shaped.

The spindle shown in Fig. 1 is for priming cartridges for use in the breech-loading firearm which is the subject of Gilbert Smith's Patent No. 17,644; and the head of the said spindle is made nearly flat, that the fulminate placed upon it may be thrown off by centrifugal force in a nearly horizontal direction into the annular cavity of the hollow flange $e$.

The spindle shown in Fig. 2 is for priming the cartridge commonly known as "Smith & Wesson's," and the top of the head of the spindle is made more concave than in that shown in Fig. 1, that the fulminate may be thrown off in a more upward direction into the annular cavity of the hollow laterally-projecting flange $e'$.

The spindle shown in Fig. 3 is for priming the cartridge which is the subject of reissued Letters Patent of Ellis and White, No. 1,529, and is made still more concave that the fulminate may be thrown off in a still more upward direction into the annular cavity of the longitudinally-projecting hollow flange $e^2$.

The operation is as follows: Before the cartridge-shell is placed on the spindle F, and while the said spindle is stationary, a proper quantity of fulminate priming in a sufficiently fluid state is placed on or in the top of the head of the spindle by hand or by any suitable mechanical device. The shell is then placed on the spindle and pushed down to the shoulder $d$, and on rapid rotary motion being given to the spindle the fulminate is thrown by centrifugal force into and all around the annular cavity or receptacle provided for it in the shell. The distribution of the fulminate around the shell is perhaps rendered more perfect by having the shell rotate with the spindle F; but I do not consider such rotation of the shell to be absolutely necessary, as the revolving spindle will not fail to distribute the priming all around the shell if the latter be held stationary, by similar means, while the spindle rotates within it.

By the use of the rotating spindle to deposit fulminate in the cartridge-shell I am enabled to properly prime the cartridge with less fulminate than is required when the fulminate is deposited directly upon the head of the shell and merely distributed by centrifugal force, for in the latter case some fulminate will always remain on the central portion of the head, where it is useless in cartridges which are exploded by striking on the edge or periphery. Moreover I am enabled by the use of said spindle to deposit the fulminate by centrifugal force into the hollow flange of a cartridge-shell such as is represented in Fig. 1, which could not be done if the fulminate were first placed in the head of the shell; and I will remark in relation to this form of cartridge-shell that no satisfactory means of priming it has heretofore been known.

I do not here intend to claim, broadly, distributing the fulminate priming in a cartridge by the action of centrifugal force.

What I claim as my invention, and desire to secure by Letters Patent, is—

The employment, for depositing the fulminate priming around the interior of a cartridge-shell, of a spindle upon which the said priming is first placed, and the revolution of which throws the said priming directly into its place by centrifugal force, substantially as herein specified.

TIMOTHY J. POWERS.

Witnesses:
HENRY T. BROWN,
J. W. COOMBS.